United States Patent Office 3,646,081
Patented Feb. 29, 1972

3,646,081
POLYMERIC TIN MERCAPTIDES
Bernard Buchholz, Blue Bell, Pa., assignor to
Pennwalt Corporation, Philadelphia, Pa.
No Drawing. Filed Sept. 22, 1969, Ser. No. 860,094
Int. Cl. C07f 7/22; C08f 45/56
U.S. Cl. 260—429.7                                    5 Claims

ABSTRACT OF THE DISCLOSURE

Polymeric tin mercaptides of structure:

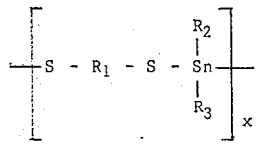

where $R_1$ is the hydrocarbon residue of a cycloaliphatic dimercaptan, $R_2$ and $R_3$ are alkyl groups of 4 to about 10 carbon atoms, and $x$ is an integer from about 2 to about 10. The compounds of the invention are useful as non-toxic thermal stabilizers for polymers such as polyvinyl and polyvinylidene halides.

---

Tin compounds have been reacted with mercaptans and with dimercaptans heretofore to make tin mercaptides, but a new class of polymeric tin mercaptides has now been found which have surprisingly low toxicity properties.

Organotin compounds are known to have highly toxic properties and have therefore found uses as bactericides, fungicides, insecticides and other biocidal uses. However, such tin compounds must be handled with care because they also, in general, have very high animal and human toxicity. Discussion of the high toxicity or organotin compounds will be found in the Tin Research Institute's publication Investigations in the Field of Organotin Chemistry (1955) by J. G. A. Luijten and G. J. M. van der Kerk.

Numerous applications for organotin compounds in polymers have been disclosed. For example, organotin compounds appear to have an excellent stabilizing effect on polymers, as for example, thermal stabilization of polyvinyl chloride, where tin mercaptides are particularly effective. The high human toxicity of tin mercaptides, however, has hindered commercial use, particularly in plastics for food applications. In fact, only one tin mercaptide with FDA clearance is available for commercial use as a vinyl stabilizer and that is the compound di(n-octyl) tin S, S'-bis(isooctylmercaptoacetate), $(n-C_8H_{17})_2Sn(SCH_2COO$-iso $C_8H_{17})_2$ This compound has an $LD_{50}$ of 0.6 gram/kg. when administered orally to mice. Thus, there is a need for new, less toxic, thermal stabilizers.

In accord with the invention, there are now provided organotin compounds useful as thermal stabilizers in polymers and having surprisingly low toxicity properties. These novel tin stabilizers are polymeric compounds of structure

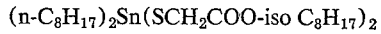

where $R_1$ is the hydrocarbon residue of a cycloaliphatic dimercaptan, $R_2$ and $R_3$ are alkyl groups containing from four to about ten carbon atoms, and $x$, which indicates the polymeric nature of the compounds, is an integer from about 2 to about 10.

The saturated hydrocarbon residue of a cycloaliphatic dimercaptan, $R_1$, will preferably be derived from a cyclodiolefin by reaction with $H_2S$ to yield the dimercaptan.

Thus, for example, vinylcyclohexene will add $H_2S$ in the presence of free radical catalysts, such as ultraviolet light, gamma radiation, peroxides or azo compounds, as follows to give vinylcyclohexene dimercaptan:

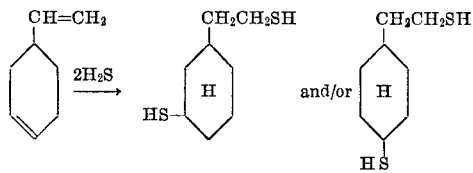

In a similar manner d-limonene or dipentene react with $H_2S$ as follows to give d-limonene dimercaptan or dipentene dimercaptan:

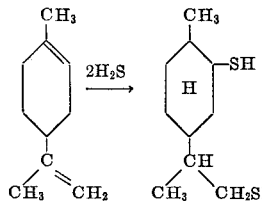

The preferred compounds of the invention will be of structure:

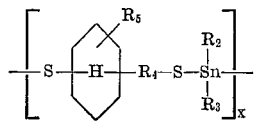

where $R_4$ is lower alkylene, $R_2$ and $R_3$ are defined above, $R_5$ is H or lower alkyl and $x$ is 2 to 10.

In making the polymeric compounds of the invention, the above described dimercaptans are reacted with a dialkyltin oxide of salt; e.g.

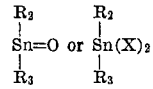

where $R_2$ and $R_3$ are defined above and X is a salt anion such as halide (e.g. chloride, bromide, etc.), acetate, and the like. $R_2$ and $R_3$ may be $C_4$ to $C_{10}$ alkyl, such as butyl, hexyl, octyl, and the like. Reaction is usually carried out in a refluxing aromatic solvent (e.g., benzene, toluene, xylene, etc.) and when a tin salt is used, an acid acceptor such as sodium carbonate is generally added. The following examples will illustrate the preparation of the compounds of the invention:

EXAMPLE I

Dibutyltin vinylcyclohexene dimercaptide (A) From dibutyltin oxide

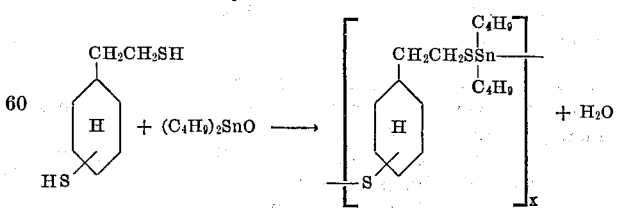

A solution of 21.65 g. (0.123 mol) of vinylcyclohexene dimercaptan and 30.56 g. (0.123 mol) of dibutyltin oxide in 350 cc. of toluene was refluxed until water was no longer formed, as determined with a Barrett water trap. The toluene was removed, giving 48.8 g. (97.5%) of viscous, pale yellow product soluble in ether, benzene, acetone, hexane, insoluble in water and ethanol and having a refractive index of 1.5804 $D^{25}$. Molecular weight determination is difficult because of dissociation in the solvents used for measurement, but the results indicated $x$ had a value of at least 2 or 3.

*Analysis.*—Calculated (percent): C, 47.2; H, 7.9; S, 15.7; Sn, 29.1. Found (percent): C, 47.4; H, 8.3; S, 15.5; Sn, 28.2.

(B) From dibutyltin diacetate

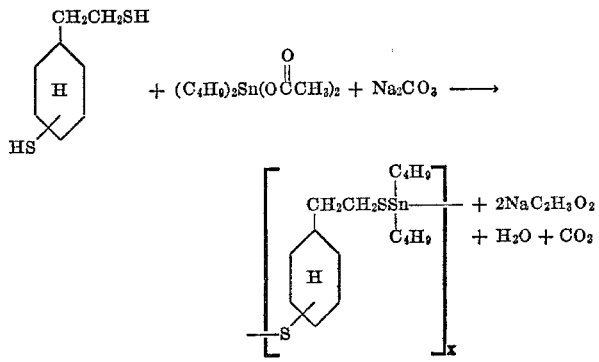

A mixture of 22.96 g. (0.13 mol) of vinylcyclohexene dimercaptan, 45.7 g. (0.13 mol) of dibutyltin diacetate and 15.7 g. of sodium carbonate, in 400 cc. of toluene and 25 cc. of water was refluxed for 6 hours, filtered, washed with water and the toluene was removed to give 52.5 g. (99%) of the product as a viscous, pale yellow residue as described above.

Calculated (percent): C, 47.2; H, 7.9; S, 15.7; Sn, 29.1. Found (percent): C, 47.15; H, 8.11; S, 15.44; Sn, 28.0.

EXAMPLE II

Dioctyltin vinylcyclohexene dimercaptide

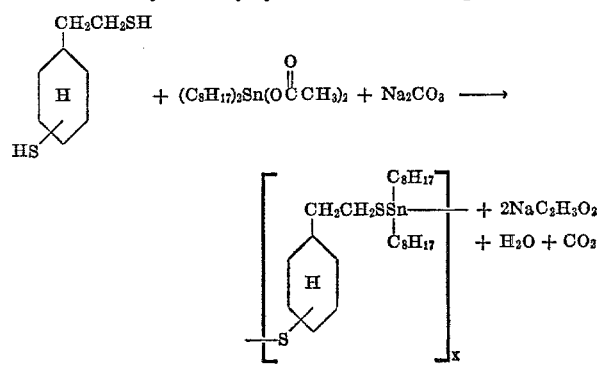

Using equimolar quantities of vinylcyclohexene dimercaptan and dioctyltin diacetate and the same procedure as in 1–B above, the product was obtained as a viscous, yellow liquid in 88% yield. Solubility properties are the same as those of the product of Example I. Refractive index of the product was 1.5476 $D^{25}$ and a molecular weight determination showed $x$ to be greater than 1.

Calculated (percent): C, 55.49; H, 9.31; Sn, 22.85. Found (percent): C, 55.56; H, 9.49; Sn, 21.9.

EXAMPLE III

Dibutyltin d-limonene dimercaptide

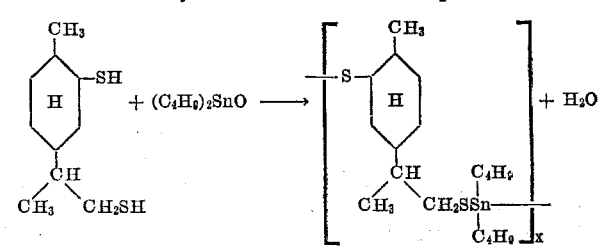

Equimolar quantities of d-limonene dimercaptan and dibutyltin oxide were reacted as in 1–A above, to give an 87% yield of the viscous, pale yellow product having a refractive index of 1.5658 $D^{25}$. Molecular weight determination in a benzene solution gave a value of 836 which decreased with time, indicating gradual dissociation of the polymeric product in the solvent (benzene).

*Analysis.*—Calculated (percent): 49.66; H, 8.34; S, 14.7; Sn, 27.3. Found (percent): C, 48.3; H, 8.36; S, 13.6; Sn, 26.6.

EXAMPLE IV

Dioctyltin d-limonene dimercaptide

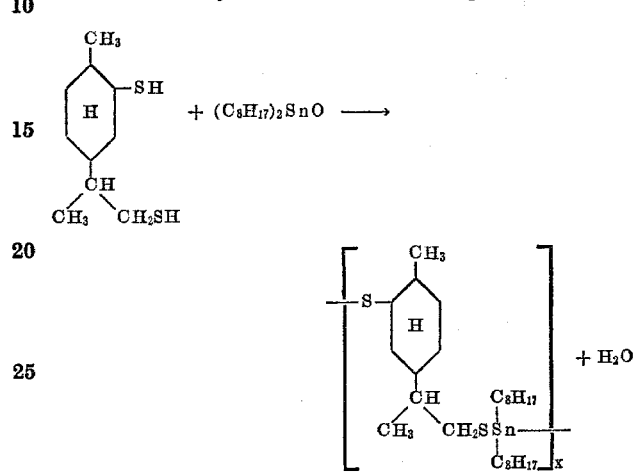

Equimolar quantities of a d-limonene dimercaptan and dioctyltin oxide were reacted as in 1–A above, to give a 99% yield of a viscous, pale yellow product having a refractive index of 1.5367 $D^{25}$.

As indicated, the compounds of the invention have very surprising toxicity properties.

Acute oral toxicity studies in mice showed that the compound of Example II was completely non-toxic at dosage levels as high as 10 grams/kg. An acute subcutaneous toxicity determination gave an $LD_{50}$ value greater than 10 grams/kg. for the Example II product.

The test data are in the following Table I.

TABLE I

Toxicity in mice of 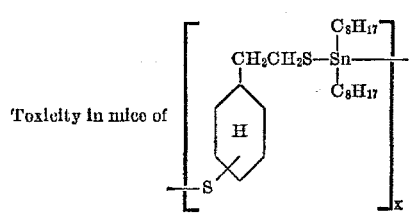

(A) Acute oral toxicity

*Method I.*—Administered as an aqueous emulsion (in 15% polysorbate 20 plus 6.7% Arlacel C) by stomach tube to make $CF_1$ mice, ±22 g. BW. Animals observed 7 days post-dosage.

Results:

| Oral dose, g./kg. | No. mice, dead/total | Mortality, percent |
|---|---|---|
| 5.0 | 0/5 | 0 |
| 7.0 | 0/5 | 0 |
| 10.0 | 0/10 | 0 |

NOTE.—LD => 10.0 grams/kg. Symptomatology=None.

*Method II.*—Administered as a 40% solution in corn oil by stomach tube to ten $CF_1$ mice, 23± g. BW, at a single dosage level of 10 grams/kg. Animals observed seven days post-dosage.

Results: No signs of toxicity were seen among any of the treated animals. Although minor losses in body weight occurred for several days after dosage, these were recovered fully during the seven day observation period.

Conclusions: Nontoxic at 10 grams/kg.

(B) Acute subcutaneous toxicity in mice

*Method.*—Administered as a solution in corn oil or sesame oil by injection beneath the skin of the flank in male $MF_1$ mice, $20\pm$ g. BW. Observed fourteen days post-dosage.

| S.c. dose, c/kg. | No mice, dead/total | Morality, percent | Time for death, days |
|---|---|---|---|
| 0 [1] | 0/10 | 0 | |
| 2 | 0/4 | 0 | |
| 4 | 0/4 | 0 | |
| 10 | 1/10 | 20 | 9 |

[1] Solvent 25 cc./kg.

NOTE.—$LD_{50}=>$10grams/kg.; Symptomology = Gradual losses in body weight until death.

In similar toxicity tests with the compound of Example I, the compound showed an $LD_{50}$ value of 1.4 grams/kg. (also a surprisingly high $LD_{50}$ value) but did cause jaundice after 48 hours.

The compounds of the invention are of value as thermal stabilizers for polymers, particularly vinyl halide and vinylidene halide polymers and copolymers. Preferred polymers which will be stabilized with the compound of the invention include polyvinyl chloride (PVC), polyvinylidene chloride, vinyl chloride-vinyl acetate copolymers, and such copolymers as are obtained by polymerization of vinyl chloride with other copolymerizable compounds such as vinyl esters, maleates, fumarates, acrylates, methacrylates and others.

Evaluation of the compounds of the invention follow:

Evaluation as PVC stabilizers—oven test

Plasticized PVC sheets, 40 mils thick, containing 1.5% by weight of the tin mercaptide stabilizer were prepared on a hot (300° F.) two-roller mill using 2 parts of unstabilized PVC resin (Allied's Plaskon SG–414) to 1 part of dioctylphthalate and the appropriate amount (2.25 parts per hundred parts of resin (phr.)) of the tin mercaptide. Test samples, stamped from the sheets, were inserted on trays into a circulating air oven at 380° F. and the discoloration rates were observed. The degree of yellowing during the test and the time to blackening of the samples were used as the criteria to evaluate the effectiveness of the stabilizer formulations.

Metal and Thermit Corporation's commercial Thermolite 31 and Thermolite 73 stabilizers, both believed to be dibutyltin bis(isooctyl mercaptoacetate) formulations, which are currently widely used for PVC non-food bottles manufacture, were used as standards for comparison in the tests.

The following table indicates the results obtained:

| Minutes at 380° F. | M & T Corporation | | Product of Ex. I | Product of Example II from— | |
|---|---|---|---|---|---|
| | Thermolite 31 | Thermolite 73 | | Diacetate method | Oxide method |
| 0 | C | C | C | C | C |
| 15 | VPY | VPY | Y | Y | Y |
| 30 | VPY | VPY | Y | Y | Y |
| 45 | LY | LY | Y | Y | Y |
| 60 | Y | Y | Y | Y | Y |
| 75 | B | A | Y | Y | Y |
| 90 | B | B | Y | B | B |
| 105 | BLK | B | Y | B | B |
| 140 | BLK | BLK | B | BLK | BLK |

Color key.—C = clear, colorless; VPY = very pale yellow; LY = light yellow; Y = yellow; A = amber; B = brown; BLK = black.

The excellent long-term stabilizing effect of the products of this invention is evident from the above data.

It will be understood that the polymeric tin mercaptides of the invention may be formulated in the usual manner with other additives such as anti-oxidants, chelating agents, plasticizers, fillers, dyes, etc. The early yellowing quality of PVC stabilized with the products of this invention in oven tests as above is in fact further improved by the use of small amounts of commercially available phenolic type antioxidants in the PVC formulations. The particular advantages of the compounds of the invention reside in their excellent long-term stabilizing effects in combination with low toxicity. This permits their use in plastic containers, film, bottles and other articles which come in contact with food.

I claim:

1. Tin mercaptides of structure

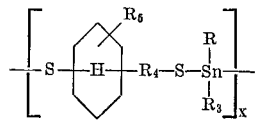

where $R_2$ and $R_3$ are alkyl of 4 to 10 carbon atoms, $R_4$ is lower alkylene, $R_5$ is H or lower alkyl and $x$ is 2 to 10.

2. A polymeric mercaptide as in claim 1 of the formula

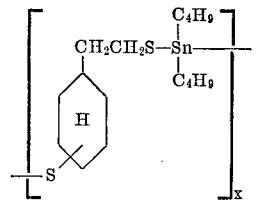

3. A polymeric mercaptide as in claim 1 of the formula

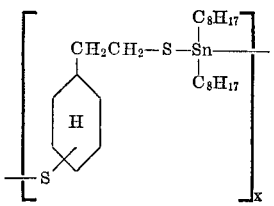

4. A polymeric mercaptide as in claim 1 of the structure

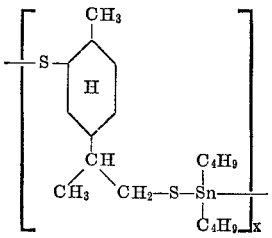

5. A polymeric mercaptide as in claim 1 of the structure

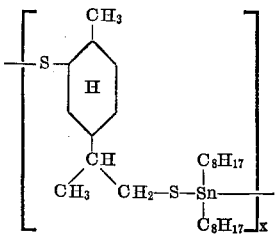

References Cited

UNITED STATES PATENTS

| 2,731,484 | 1/1956 | Best | 260—429.7 |
| 3,410,884 | 11/1968 | Mack | 260—429.7 |

TOBIAS E. LEVOW, Primary Examiner

W. F. W. BELLAMY, Assistant Examiner

U.S. Cl. X.R.

260—45.75 K